B. HARRIS.
SIGNAL.
APPLICATION FILED APR. 24, 1917.
1,280,023.
Patented Sept. 24, 1918.
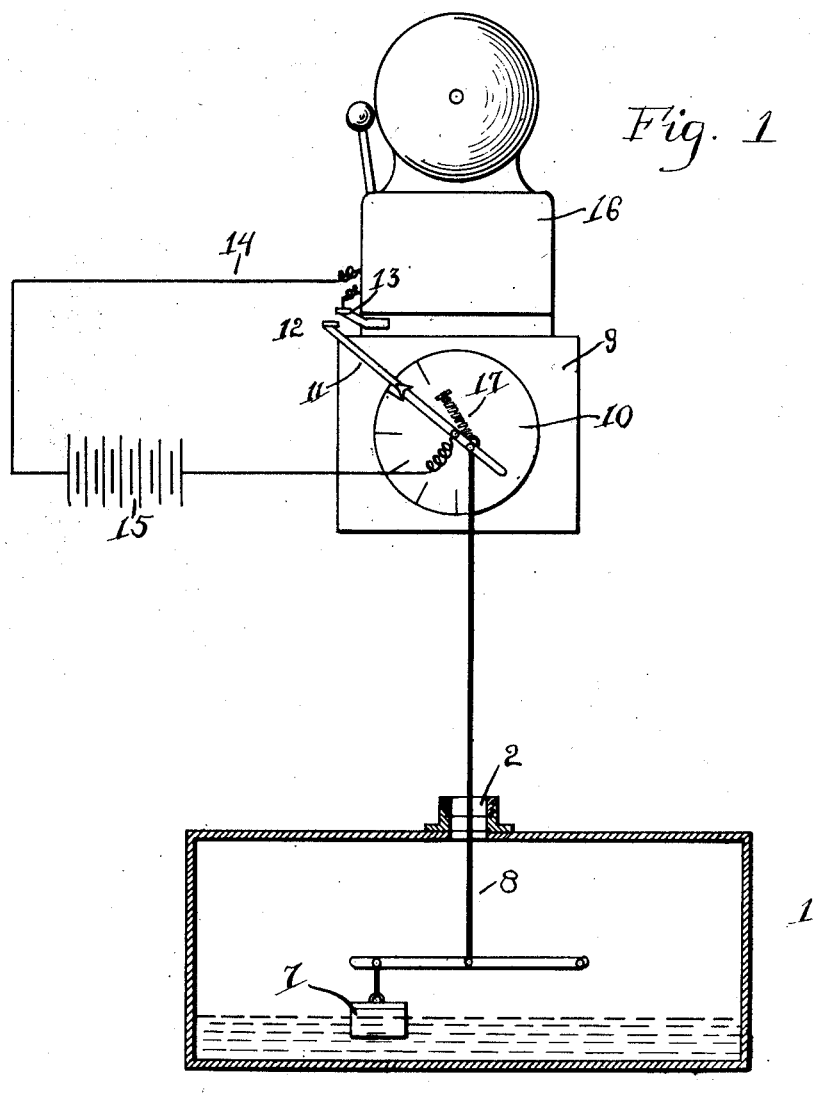
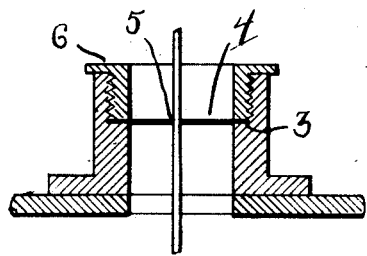
WITNESSES
Thos. B. Roscow.
INVENTOR
Benjamin Harris
BY Victor J. Evans
ATTORNEY

UNITED STATES PATENT OFFICE.

BENJAMIN HARRIS, OF DAYTON, PENNSYLVANIA.

SIGNAL.

1,280,023.

Specification of Letters Patent. Patented Sept. 24, 1918.

Application filed April 24, 1917. Serial No. 164,246.

*To all whom it may concern:*

Be it known that I, BENJAMIN HARRIS, a citizen of the United States, residing at Dayton, in the county of Armstrong and State of Pennsylvania, have invented new and useful Improvements in Signals, of which the following is a specification.

This invention relates to a signaling device by means of which the level of a liquid may be indicated and an audible signal given and has for its primary object to accomplish this result with the minimum number of parts and in which the parts are so assembled that the passage of gasolene will be prevented.

An object of the invention is the novel manner of connecting the signaling means and float device and associating the same with an improved form of cap for preventing the passage of gasolene fumes.

With these and other objects in view the invention will be better understood from the following detail description taken in connection with the accompanying drawing wherein:—

Figure 1 is a diagrammatic view of my invention.

Fig. 2 is an enlarged sectional view through the cap.

Referring again to the drawing the numeral 1 designates any suitable form of gasolene tank provided with a liquid inlet 2. The wall of this inlet is of different diameters to form a shoulder 3 upon which rests a disk 4 of any suitable flexible material such as a disk of rubber or a more rigid material such as mica.

The center of this disk is pierced by an opening 5 for a purpose hereinafter described. The disk is held against movement by a cap 6 having a threaded engagement with the wall of the inlet and binding against the disk. Mounted for arcuate movement within the tank is a float device 7 having connection with one end of a cable 8 that has a tight connection with, and slidably passes through the opening 5; thus it will be seen that the cable is free to slide, but enough friction is accomplished between the cable and the wall of the opening 5 to prevent the passage of gasolene fumes.

Shown in a diagrammatic manner is an indicator 9, consisting of a dial 10 and a pointer 11. In this particular instance the pointer 11 is elongated to form a contact 12 adapted to engage a stationary contact 13 when the level of the liquid in the tank 1 lowers a predetermined degree. When the contacts 12 and 13 come into engagement the circuit 14 is closed including a source of current 15 and a bell 16. A spring 17 is arranged to coöperate with the float for insuring the accurate movement of the pointer with the movement of the float in either direction.

From the foregoing description taken in connection with the accompanying drawing it should be apparent that I provide a device that is admirably adapted for the purpose intended and which may be manufactured and sold at a comparatively low cost and in which the parts are so associated that accurate movement thereof is positive while at the same time escapage of gasolene fumes is prevented.

Having described my invention what I claim is:—

1. In combination with a signaling device including a reciprocatory element, a tank having an inlet for the passage of said element and a flexible disk arranged over the outlet and having a circular opening, the wall of which slidably engages said element for the purpose set forth and an element removably holding said disk in air tight connection with the tank.

2. In combination with a signaling device including a reciprocatory element, a tank having an inlet for the passage of said element, a flexible removable disk arranged over the outlet and slidably engaging said element and a cap provided with a through opening accommodating said element and having a screw threaded engagement with the tank and binding against the disk for accomplishing an air tight connection between the disk and tank.

In testimony whereof I affix my signature.

BENJAMIN HARRIS.